United States Patent

[11] 3,599,100

[72] Inventor Michael H. E. Ward
Cambridge, England

[21] Appl. No. 776,730
[22] Filed Nov. 18, 1968
[45] Patented Aug. 10, 1971

[73] Assignee Pye Limited
Cambridge, England

[32] Priority Nov. 30, 1967
[33] Great Britain
[31] 54685/67

[54] BATTERY ECONOMY APPARATUS
8 Claims, 5 Drawing Figs.

[52] U.S. Cl. ........ 325/492, 307/297
[51] Int. Cl. ........ H04b 1/16
[50] Field of Search ........ 325/492, 494; 307/247, 297; 323/22

[56] References Cited

UNITED STATES PATENTS

| | | | |
|---|---|---|---|
| 2,597,264 | 5/1952 | Russell et al. | 315/156 |
| 3,372,338 | 5/1968 | Kubota et al. | 325/364 |
| 3,488,596 | 1/1970 | Webster et al. | 325/492 |

*Primary Examiner*—Robert L. Richardson
*Attorney*—Holcombe, Wetherill & Brisebois

ABSTRACT: This invention relates to a battery-operated transistor radio receiver incorporating a battery economizer circuit for reducing the power consumption from the battery in the absence of a received signal and including a semiconductor switch device for rendering the direct-current path to the receiver alternately conductive and nonconductive and which is maintained switched on upon receipt of an incoming signal. According to the invention, the semiconductor switch device is so arranged that it also acts as a series-stabilizing element of a substantially constant voltage source derived from the battery and forming the power supply to the receiver. Means are also disclosed for protecting the switch device against damage in the event of a heavy overload on the stabilized voltage supply line to the receiver.

BATTERY ECONOMY APPARATUS

This invention relates to apparatus for obtaining reduced power consumption from the direct current supply for a radio receiver in the absence of a signal.

In many battery-operated radio receivers, particularly those designed to be carried unobtrusively on the person, e.g. in a breast pocket of a jacket, the size of the battery is limited, and means of economizing battery consumption by the receiver give, for a given size of battery, a longer working period before replacement or recharging is necessary.

Battery economy becomes very important when the receiver is of the type which alerts the wearer when a signal is transmitted, as such receivers may, in some applications, be carried for long periods by persons whom it may be desired to call only in an emergency.

In U.S. Pat. No. 3,488,596, issued Jan. 6, 1970 a battery economizer circuit is described which comprises a multivibrator having a mark/space ratio of less than unity controlling a transistor switch in the supply line to the receiver, and an inhibitor holding the multivibrator inoperative and the transistor switch closed when a signal is received.

In some receivers, for example those working on a fixed frequency and using crystal control of the heterodyne oscillators therein, a stabilized constant voltage is advantageous for optimum results. Preferably the stabilized voltage should be equal to or slightly lower than the end of life voltage of the battery, so that maximum utilization may be obtained.

It is an object of the invention to provide a battery economizer circuit producing a stabilized output voltage.

According to the invention, a battery economizer circuit includes a semiconductor switch controlling the power supply to the receiver and also acting as a series-stabilizing element of a substantially constant voltage supply, which forms said power supply to the receiver.

According to a feature of the invention, the economizer circuit includes means for protecting the circuit against a short circuit on the supply line.

The invention will now be further described by way of example, with reference to the accompanying drawings, in which.

Figure 1:
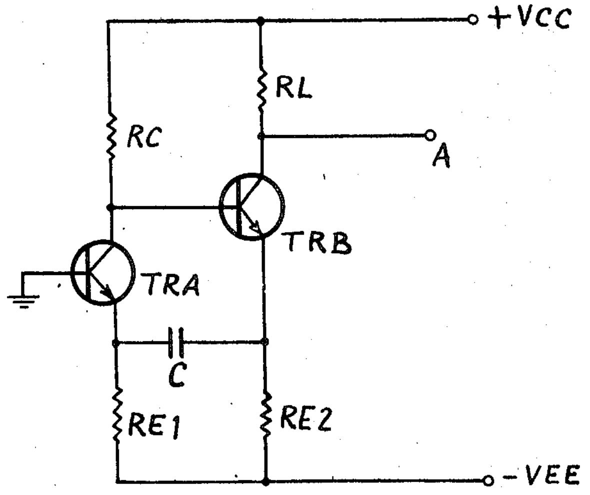
FIG. 1 is a circuit diagram of one type of multivibrator using a tapped supply battery or two batteries.

One known version of an emitter-coupled astable multivibrator is shown in FIG. 1 with transistors TRA and TRB having collector resistors RC and RL and emitter resistors RE1 and RE2 respectively. For good stability of mark/space ratio and repetition rate, voltage VEE is made considerably larger than voltage VCC, and resistors RE1 and RE2 are made large with respect to RC and RL. The output level from terminal A is, however, small.

Figure 2:
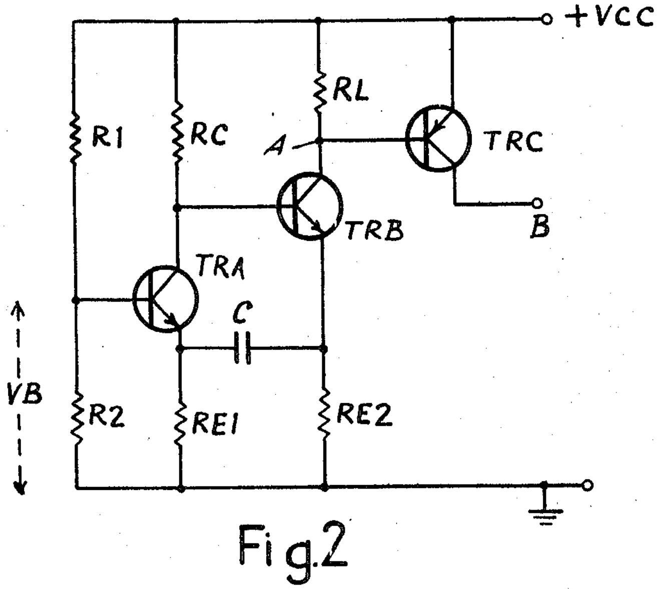
FIG. 2 is a circuit diagram of a similar multivibrator using a single untapped battery.

When only two supply terminals are available, as is often the case, a potential divider comprising resistors R1 and R2 is used to feed the base of transistor TRA, as shown in FIG. 2. In such a circuit, the capacitor C in conjunction with resistor RE1 mainly determines the ON time of a switching transistor TRC if resistor RL is small, and resistor RE2 mainly determines the OFF time if resistor RC is small, and for a short ON time resistor RE1 must be made small. To minimize current passed by the multivibrator in the OFF condition, i.e. TRA conducting, TRB and TRC nonconducting and no output from terminal B, voltage VB must be small and in this mode of working the VEE of transistor TRA plays an important part, so losing the stability due to the large VEE present in the multivibrator of FIG. 1.

Figure 3:
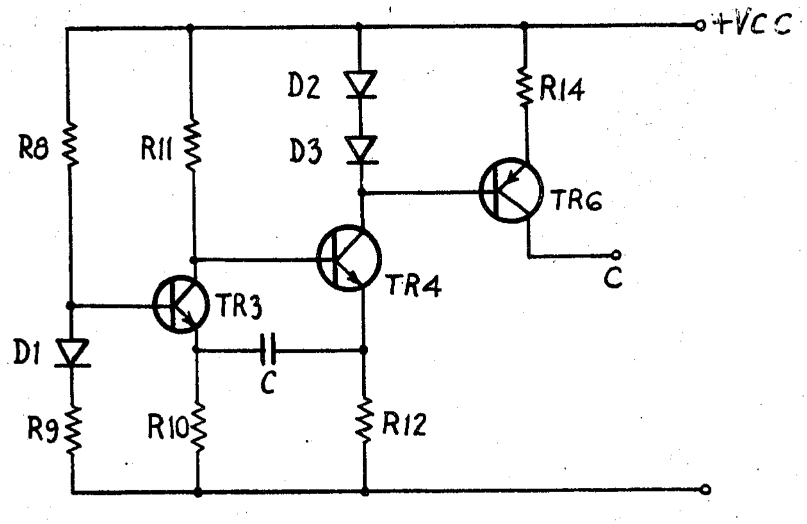
FIG. 3 is a circuit diagram of a multivibrator in which some of the disadvantages occurring in the multivibrator of FIG. 2 have been overcome, and is a part of the circuit shown in FIG. 5.
Figure 5:
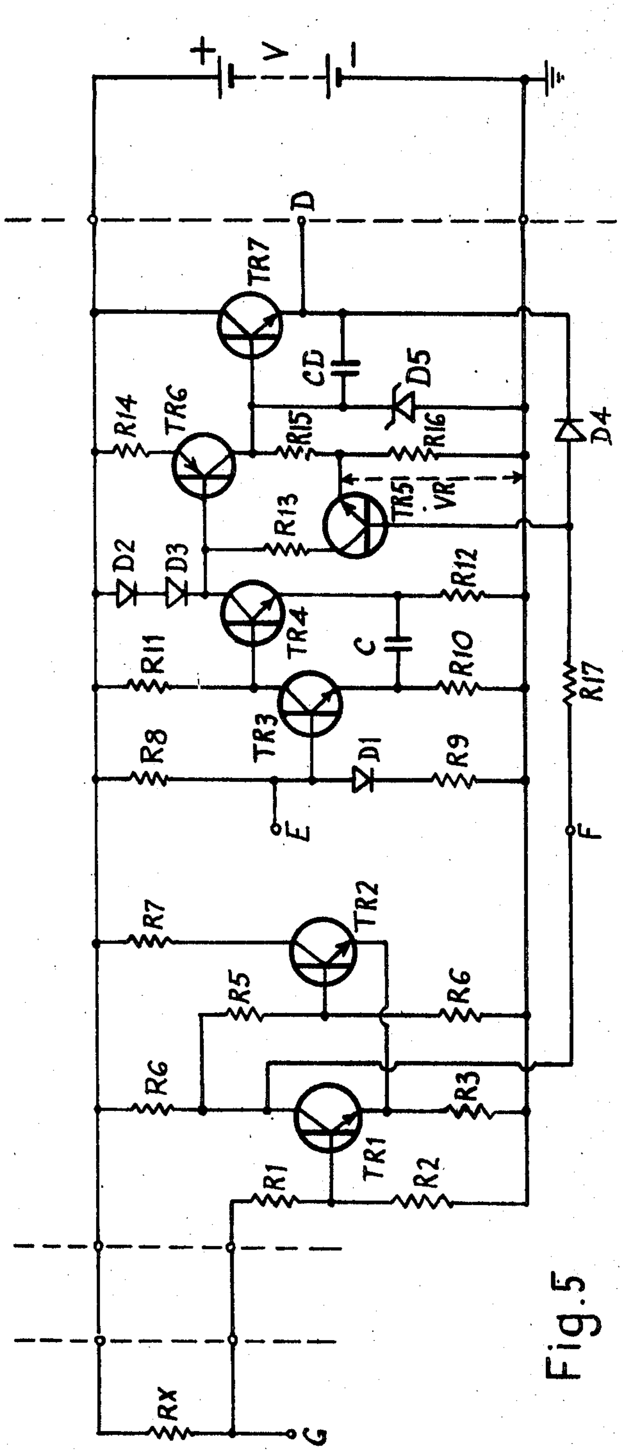
FIG. 5 is a circuit diagram of part of a receiver using one embodiment of battery economy and stabilizer circuit according to the invention.

To regain this stability the circuit of FIG. 3, which is a part of FIG. 5, may be employed, in which resistors R8 and R9 are equal to R11 and R10 respectively, with a diode D1 in the potentiometer chain and the base of transistor TR3 connected to the junction of resistor R8 and diode D1. Transistor TR3 and diode D1 should be of the same material, i.e. both of silicon or both of germanium.

In the ON condition, i.e. transistors TR4 and TR6 conducting and current available from terminal C, serially connected diodes D2 and D3 in the collector circuit of TR4 provide a constant voltage with respect to the positive supply terminal, and this voltage may also be obtained by feeding current through them from a source other than TR4. The ON resistance of diodes D2 and D3 is low and thus, for a given value of resistor R10, minimum economized supply ON time may be achieved.

Figure 4:
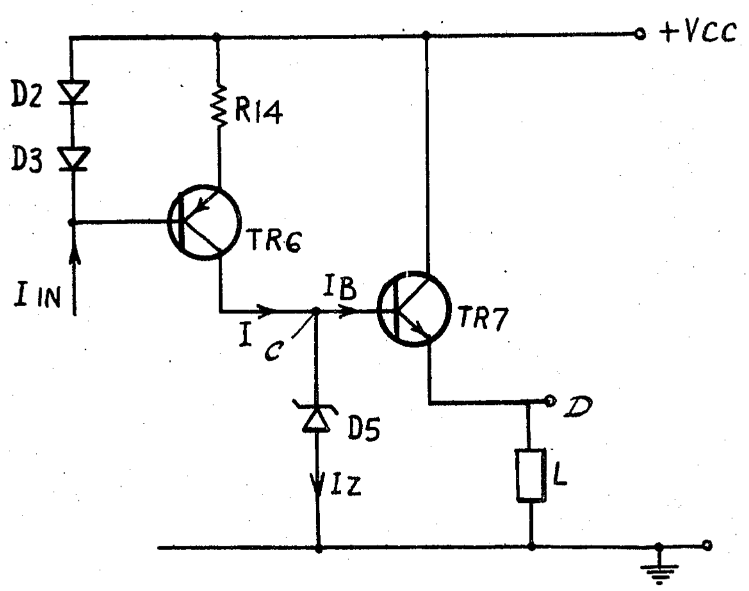
FIG. 4 is another part of the circuit shown in FIG. 5 and illustrates a means of voltage stabilization.

In the series stabilizer circuit of FIG. 4, (which also forms part of FIG. 5) the current I is equal to the sum of the transistor TR7 base current IB plus the current IZ through the Zener diode D5. The base current IB can vary from 0 (approx.) to IL (max.)/HFC and for maximum stabilizing range the current I should not be less than IZ (min.) plus IL (max.)HFC, where IZ (min.) is the minimum current needed to maintain zener action, HFC is the emitter follower current gain of transistor TR7, and IL (max.) is the maximum current through the load L connected to the emitter of transistor TR7 at terminal D. If the current I is reduced to zero, IL is also reduced to zero and the stabilizer is OFF, whereas if I is increased beyond IZ (min.) plus IL (max.)/HFC, stabilizing action is maintained but the excess current flows through the Zener diode D5 and is wasted. The current I may be maintained at approximately the optimum value by obtaining it from a constant current source such as transistor TR6 with emitter resistor R14.

In this embodiment silicon semiconductors are used throughout so that the VBE of a conducting transistor and the ON voltage of a diode are both 0.7 volts. The voltage across resistor R14 is thus 0.7 volts (2 ×0.7 minus 0.7 ) and hence the emitter current of transistor TR6 is equal to 0.7/R14, the collector current I being of approximately the same value.

In the combined economizer and stabilizer shown in FIG. 5 which uses references corresponding to those of FIGS. 3 and 4 for like components, diodes D2 and D3 provide a constant voltage supply to the base of transistor TR6 and also provide a low-resistance load for one collector of the emitter coupled multivibrator comprising transistors TR3 and TR4. When transistor TR3 is conducting, transistors TR4, TR6 and TR7 are nonconducting and no output is available at terminal D. When transistor TR3 is nonconducting transistors TR4, TR6 and TR7 are turned on, the voltage at terminal D being determined and stabilized by the zener voltage of Zener diode D5. A receiver or parts thereof connected between terminal D and the earthed negative supply line will thus alternatively be deprived of power or receive power from battery V at a constant stabilized voltage irrespective of normal variations of battery voltage.

Control of the operation of the economizer by the receiver whereby receipt of a signal holds the switching transistor TR7 conducting to provide an uninterrupted supply of power to the receiver, may be accomplished in several alternative ways. In one method, a signal received during the time when power is supplied to the receiver may be arranged to draw additional current through resistor R8 via terminal E to increase the voltage drop across that resistor to approximately the supply battery voltage, so holding transistor TR3 nonconducting with the multivibrator inoperative and stabilized voltage available at terminal D for the duration of the signal. However, should a heavy overload, e.g. a short circuit, occur on the stabilized supply during such time, switching transistor TR7 could be damaged. To avoid this transistor TR5, with its associated resistors R13, R15, R16, R17 and diode D4 are used. Resistors R15 and R16 form a potentiometer to provide a voltage VR from which the emitter of transistor TR5 is supplied. To avoid current drain when the economizer is in the OFF condition, they are placed across the Zener diode D5 in preference to the battery V. In another control method, a signal received during the ON period may be arranged to supply a positive hold voltage to terminal F of sufficient amplitude to cause transistor TR5 to conduct. Collector current then flows through limiting resistor R13 and diodes D2 and D3, to hold TR6 and TR7 conducting, while the astable multivibrator comprising TR3 and TR4 continues to run. If the hold voltage is less than VR, transistor TR5 is reverse biased and nonconducting when the stabilized voltage is ON, i.e. available at terminal D, and substantially nonconductive due to the voltage drop across resistor R17 from current through diode D4 when the economizer is in the OFF condition and no voltage VR is present. The presence of a hold voltage during an OFF period is, under normal conditions, not to be expected during an OFF period as such a voltage is available from a receiver connected to terminal D only during an ON period in which a received signal is also present. If the hold voltage is greater than VR, transistor TR5 is allowed to switch on and hold the stabilized supply ON. Should there be a delay, due for example to time constants, in the transmission of the hold voltage, the continued running of the multivibrator will ensure that transistor TR5 is switched to conduction on he next ON period.

A short circuit on the stabilized supply line would render the receiver inoperative but due to the intermittent operation of switching transistor TR7 under the influence of the multivibrator, no damage will be caused by excessive dissipation. Should the short circuit occur during a period when there is a hold voltage present, diode D4 will conduct to lower the base potential of TR5 and prevent it conducting, so reverting the circuit to one controlled by the multivibrator and thus protecting transistor TR7 from excessive dissipation.

One method of obtaining a hold voltage for application to terminal F is shown in FIG. 5 wherein transistor TR1 and TR2 form a Schmitt trigger with transistor TR1 normally conducting. The collector of TR1 and therefore terminal F will then be at a low potential due to the voltage drop across the resistor R4 forming the collector load of transistor TR1. If a received signal is arranged to cause sufficient current to be drawn through resistor RX from terminal G, the Schmitt trigger will operate, transistor TR1 will cease to conduct, and its collector and terminal F will rise to (neglecting the base current of transistor TR5) the potential of the battery V, so holding ON the stabilized supply. Such a method provides a control voltage with two well-defined voltage levels, i.e. substantially zero and the potential of the battery V.

In order that the stabilized supply will not be switched during, for instance, short pauses occurring in a signal, the hold voltage may be arranged to persist for long enough to cover such pauses. The hold voltage may be made to persist by virtue of a charge on a capacitor, for example, connected between the earth line and the terminal F with a diode taking the place of the connection between the collector of transistor TR1 and that terminal. Alternatively the capacitor and diode may be included in circuitry prior to terminal G, or prior to terminal E if that terminal is in use for holding transistor TR3 nonconducting.

Capacitor CD plays no part in the working of the circuit but is included to prevent unwanted RF effects.

The circuit as described provides a consistent performance largely independent of production spreads in components, temperature and battery voltage. The power wasted in the stabilizer is small and the battery voltage can fall to less than 1 volt above the stabilized output before stabilization action ceases. In addition consistent large economy rations, e.g. 50:1 OFF:ON are obtainable.

I claim:

1. A battery economizer system for reducing the consumption of power from a battery in a battery-supplied radio receiver in the absence of an incoming signal to the radio receiver, said economizer circuit comprising:
A. a semiconductor switch means connected in the direct current path from the battery to the receiver and having a control terminal,
B. means connected to said control terminal for periodically rendering said switch means alternately ON (conductive) and OFF (nonconductive),
C. means for maintaining said switch means in the ON condition upon receipt by said radio receiver of an incoming signal to which the receiver is adapted to respond, and
D. a Zener diode circuit means connected to the control terminal of said switch means for causing said switch means to act as a series-stabilizing element to provide power to said receiver from said battery at a substantially constant voltage.

2. A system as claimed in claim 1, wherein the semiconductor switch means comprises:
A. a switching transistor having first and second electrodes at respective ends of its major current path, said first electrode being connected to one terminal of said battery, said second electrode being connected to supply power to the receiver, and having said control terminal for controlling flow of current in said major path, and
B. said Zener diode means being connected to said control terminal to provide a constant voltage supply between said control terminal and the other terminal of said battery.

3. A system as claimed in claim 2, further comprising:
A. a multivibrator means for controlling the switching of said switch means ON and OFF and means responsive to a received signal for rendering said multivibrator means inoperative while in its state which maintains said switch means ON, thereby feeding a stabilized voltage to said receiver.

4. A system as claimed in claim 1, further comprising protective circuit means for protecting the switch means against damage in the event of a heavy overload on the stabilized voltage supply line to the receiver.

5. A system as claimed in claim 4, in which said protective circuit means comprises
A. a further transistor having its anode connected to a further diode,
B. a potentiometer connected across said Zener diode, and
C. a connection from said potentiometer to the emitter of said further transistor.

6. A system as claimed in claim 5, further comprising:
means for applying a signal received by the receiver to a connection between said further transistor and said further diode for holding said further transistor conducting during the time that the signal is received and that the switch device is ON for supplying current to said receiver.

7. A system as claimed in claim 6, further comprising:
A. a Schmitt trigger circuit,
B. means for operating said Schmitt trigger circuit in response to a received signal, and
C. means for providing a signal from said Schmitt trigger circuit for use as the signal applied to the connection between said further transistor and said further diode.

8. A system as claimed in claim 5, further comprising:
connecting means from the stabilized supply line for rendering said further diode conducting if an overload or short circuit occurs on the stabilized supply line, the conductance of said further diode causing the further transistor to turn OFF to thus protect the switching device from excessive dissipation.